(12) United States Patent
Brandenburg et al.

(10) Patent No.: US 11,292,184 B2
(45) Date of Patent: Apr. 5, 2022

(54) EXTRUSION ADDITIVE MANUFACTURING FOR VENEER APPLICATIONS

(71) Applicant: Goodrich Corporation, Charlotte, NC (US)

(72) Inventors: Loren O. Brandenburg, Stafford Springs, CT (US); Joseph M. Tomashek, Naperville, IL (US); Nicholas W. Linck, LaGrange, KY (US); Christopher L. Chapman, Georgetown, IN (US); Brian K. Barnett, New Albany, IN (US); Ricardo O. Brown, West Hartford, CT (US); Shawn K. Reynolds, Byron, IL (US); Edward D. Thompson, Jeffersonville, IN (US)

(73) Assignee: Goodrich Corporation, Charlotte, NC (US)

( * ) Notice: Subject to any disclaimer, the term of this patent is extended or adjusted under 35 U.S.C. 154(b) by 104 days.

(21) Appl. No.: 16/716,949

(22) Filed: Dec. 17, 2019

(65) Prior Publication Data
US 2021/0178671 A1 Jun. 17, 2021

(51) Int. Cl.
*B29C 64/188* (2017.01)
*B29C 64/118* (2017.01)
(Continued)

(52) U.S. Cl.
CPC .......... *B29C 64/106* (2017.08); *B29C 64/118* (2017.08); *B29C 64/188* (2017.08);
(Continued)

(58) Field of Classification Search
CPC ... B29C 64/106; B29C 64/118; B29C 64/188; B29C 64/227; B29C 64/245; B29C 64/209; B33Y 10/00; B33Y 40/20
See application file for complete search history.

(56) References Cited

U.S. PATENT DOCUMENTS

| | | | |
|---|---|---|---|
| 1,022,970 A | 4/1912 | Ott | |
| 4,701,373 A * | 10/1987 | Fuchs | B32B 21/12 428/326 |

(Continued)

FOREIGN PATENT DOCUMENTS

| | | |
|---|---|---|
| CN | 102431065 A | 5/2012 |
| CN | 106976344 A | 7/2017 |

(Continued)

OTHER PUBLICATIONS

Partial Search Report for European Application No. 20215189.0 dated Jun. 6, 2021, 14 pages.
(Continued)

*Primary Examiner* — Joseph S Del Sole
*Assistant Examiner* — Jerzi H Moreno Hernandez
(74) *Attorney, Agent, or Firm* — Suiter Swantz pc llo

(57) ABSTRACT

A method of extrusion additive manufacturing for veneer applications may include, but is not limited to, loading material into an extruder, generating a mixture from the material, and fabricating the veneer product. Fabricating the veneer product may include depositing a first portion of the mixture on a working surface of the extruder, actuating the working surface, and depositing an additional portion of the mixture on the working surface of the extruder proximate to the first position of the mixture deposited on the working surface. Where the first portion of the mixture and the additional portion of the mixture form a first layer of the veneer product, fabricating the veneer product may include actuating a nozzle of the extruder and depositing an additional layer of the mixture on the first layer of the veneer product. The material may include wood product and a binder.

8 Claims, 10 Drawing Sheets

(51) Int. Cl.
    *B33Y 10/00*           (2015.01)
    *B33Y 40/20*           (2020.01)
    *B29C 64/106*          (2017.01)
    *B29C 64/245*          (2017.01)
    *B29C 64/209*          (2017.01)
    *B29C 64/227*          (2017.01)
    *B29L 9/00*            (2006.01)

(52) U.S. Cl.
    CPC ............ *B33Y 40/20* (2020.01); *B29C 64/209* (2017.08); *B29C 64/227* (2017.08); *B29C 64/245* (2017.08); *B29L 2009/003* (2013.01); *B33Y 10/00* (2014.12)

(56) References Cited

U.S. PATENT DOCUMENTS

| | | | |
|---|---|---|---|
| 5,123,465 A | 6/1992 | Gabriel | |
| 8,608,898 B2 | 12/2013 | Tagliabue | |
| 10,000,041 B2 | 6/2018 | Penaforte et al. | |
| 2008/0067713 A1* | 3/2008 | Bordener | B29C 48/307 |
| | | | 264/211.12 |
| 2008/0213532 A1 | 9/2008 | Engel et al. | |
| 2015/0343739 A1* | 12/2015 | Pervan | B44C 5/04 |
| | | | 52/582.1 |
| 2017/0361527 A1* | 12/2017 | Saarikoski | D01F 2/00 |
| 2018/0009127 A1 | 1/2018 | Gehrer et al. | |
| 2018/0104847 A1* | 4/2018 | Vanderminden | B32B 37/14 |
| 2018/0258559 A1 | 9/2018 | Dadmun et al. | |
| 2018/0370070 A1 | 12/2018 | Stopfer et al. | |
| 2019/0202119 A1 | 7/2019 | Budge | |
| 2019/0270268 A1 | 9/2019 | Heinsman et al. | |
| 2020/0369888 A1* | 11/2020 | Kam | C08L 5/14 |

FOREIGN PATENT DOCUMENTS

| | | |
|---|---|---|
| EP | 3526035 A1 | 8/2019 |
| GB | 2113604 A | 8/1983 |
| JP | H0481866 A | 3/1992 |
| WO | 2018194446 A1 | 10/2018 |
| WO | 2019135245 A1 | 7/2019 |

OTHER PUBLICATIONS

Search Report for European Application No. 20215189.0 dated Nov. 4, 2021, 14 pages.

* cited by examiner

EXTRUSION ADDITIVE MANUFACTURING FOR VENEER APPLICATIONS

BACKGROUND

Consumers in the aviation or automotive industry may require matching veneer in sheet or core form across a purchased lineup or fleet of vehicles (e.g., airplanes, automobiles, or like). In the case of natural lumber, a color, design, grain width, and/or grain pattern for a particular veneer may be different, whether manufactured from lumber of different species or lumber from the same species. In some cases, only one log out of thousands may meet industry requirements, meaning the use of the particular veneer for installed panels and/or spare panels may be largely limited to an amount of square footage the log provides. As such, matching veneer manufactured from natural lumber in sheet or core form may be difficult.

SUMMARY

A method of extrusion additive manufacturing for veneer applications is disclosed, in accordance with one or more embodiments of the disclosure. The method may include, but is not limited to, loading material into an extruder. The material may include wood product and a binder. The method may include, but is not limited to, generating a mixture from the material. The method may include, but is not limited to, fabricating a veneer product. Fabricating the veneer product may include, but is not limited to, depositing a first portion of the mixture on a working surface of the extruder. Fabricating the veneer product may include, but is not limited to, actuating the working surface. Fabricating the veneer product may include, but is not limited to, depositing an additional portion of the mixture on the working surface of the extruder proximate to the first position of the mixture deposited on the working surface.

In some embodiments, the first portion and the additional portion of the mixture may be deposited as part of a first layer of the veneer product. The method may include, but is not limited to, actuating a nozzle of the extruder. The method may include, but is not limited to, depositing an additional layer of the mixture on the first layer.

In some embodiments, the method may include, but is not limited to, curing the mixture to form the veneer product.

In some embodiments, the veneer product may include a three-dimensional structure. The three-dimensional structure may be formed from at least the first layer of deposited mixture and the additional layer of deposited mixture.

In some embodiments, the veneer product may include a plurality of sheets of veneer. The method may include, but is not limited to, layering the plurality of sheets of veneer. The method may include, but is not limited to, cutting the plurality of sheets of veneer into a block.

In some embodiments, the method may include, but is not limited to, binding the plurality of sheets of veneer prior to cutting the plurality of sheets of veneer into the block.

In some embodiments, the veneer product may include one or more sheets of veneer. The method may include, but is not limited to, rolling the one or more sheets of veneer into a log.

In some embodiments, the method may include, but is not limited to, binding the one or more sheets of veneer after rolling the one or more sheets of veneer into the log.

In some embodiments, the method may include, but is not limited to, cutting the log into one or more slices.

In some embodiments, the binder may be a thermoplastic.

In some embodiments, the binder may be an adhesive.

In some embodiments, the material may further include at least one of a fire-retardant or a fire-resistant material.

In some embodiments, the material may further include a metal.

A method of extrusion additive manufacturing for veneer applications is disclosed, in accordance with one or more embodiments of the disclosure. The method may include, but is not limited to, loading material into an extruder. The material may include wood product and a binder. The method may include, but is not limited to, generating a mixture from the material. The method may include, but is not limited to, fabricating a veneer product. Fabricating a veneer product may include, but is not limited to, depositing a first layer of the mixture on a working surface of the extruder. Fabricating a veneer product may include, but is not limited to, actuating a nozzle of the extruder. Fabricating a veneer product may include, but is not limited to, depositing an additional layer of the mixture on the first layer of the mixture.

In some embodiments, the first layer and the additional layer may be deposited from a first portion of the mixture. The method may include, but is not limited to, actuating the working surface. The method may include, but is not limited to, depositing an additional portion of the mixture on the working surface of the extruder proximate to the first position of the mixture deposited on the working surface.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are examples and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION OF THE INVENTION

Figure 1A:
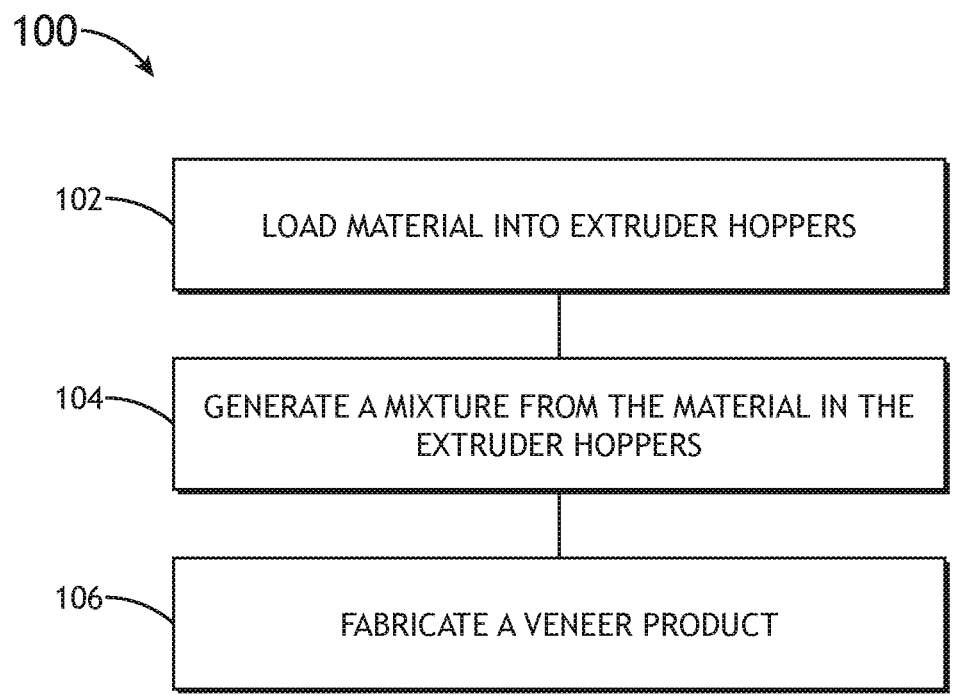
FIG. 1A is a flow diagram illustrating a method or process of extrusion additive manufacturing for veneer applications, in accordance with one or more embodiments of the disclosure.

Reference will now be made in detail to the subject matter disclosed, which is illustrated in the accompanying drawings.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

FIGS. 1A-8 generally illustrate extrusion additive manufacturing for veneer applications, in accordance with one or more embodiments of the disclosure.

With natural veneer, lumber may be cut from trees of the same species or different species. However, the trees may be located in numerous places around the world, which may result in variances of color, design, grain width, and/or grain pattern within the lumber. In some cases, only one log out of thousands may meet industry requirements, meaning the use of the particular veneer for installed panels and/or spare panels may be largely limited to an amount of square footage the log provides.

With composite veneer, a tree may be broken down and meshed into a block with the addition of color. Current methods of generating composite veneer, while more likely to match across different sources than natural veneer, may be cost-prohibitive in terms of long lead time and/or the size of the bulk order that may be required.

As such, it would be beneficial to use extrusion additive manufacturing for veneer applications to produce fabricated veneer from natural veneer, the fabricated veneer including matching color, design, grain width, and grain pattern. The fabricated veneer may address or offset the possibility of variances within the natural veneer. The fabricated veneer may be cut to custom size in a more cost-effective manner than the composite veneer.

Figure 1B:
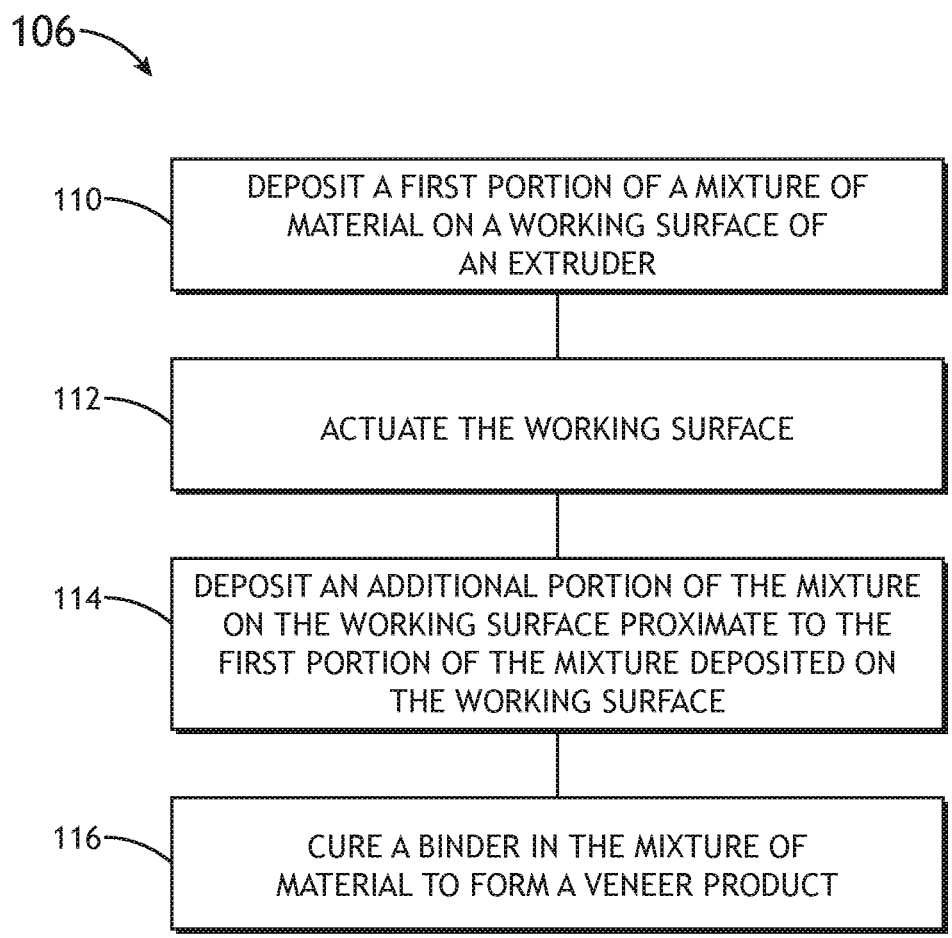
FIG. 1B is a flow diagram illustrating a method or process of extrusion additive manufacturing for veneer applications, in accordance with one or more embodiments of the disclosure.
Figure 1C:
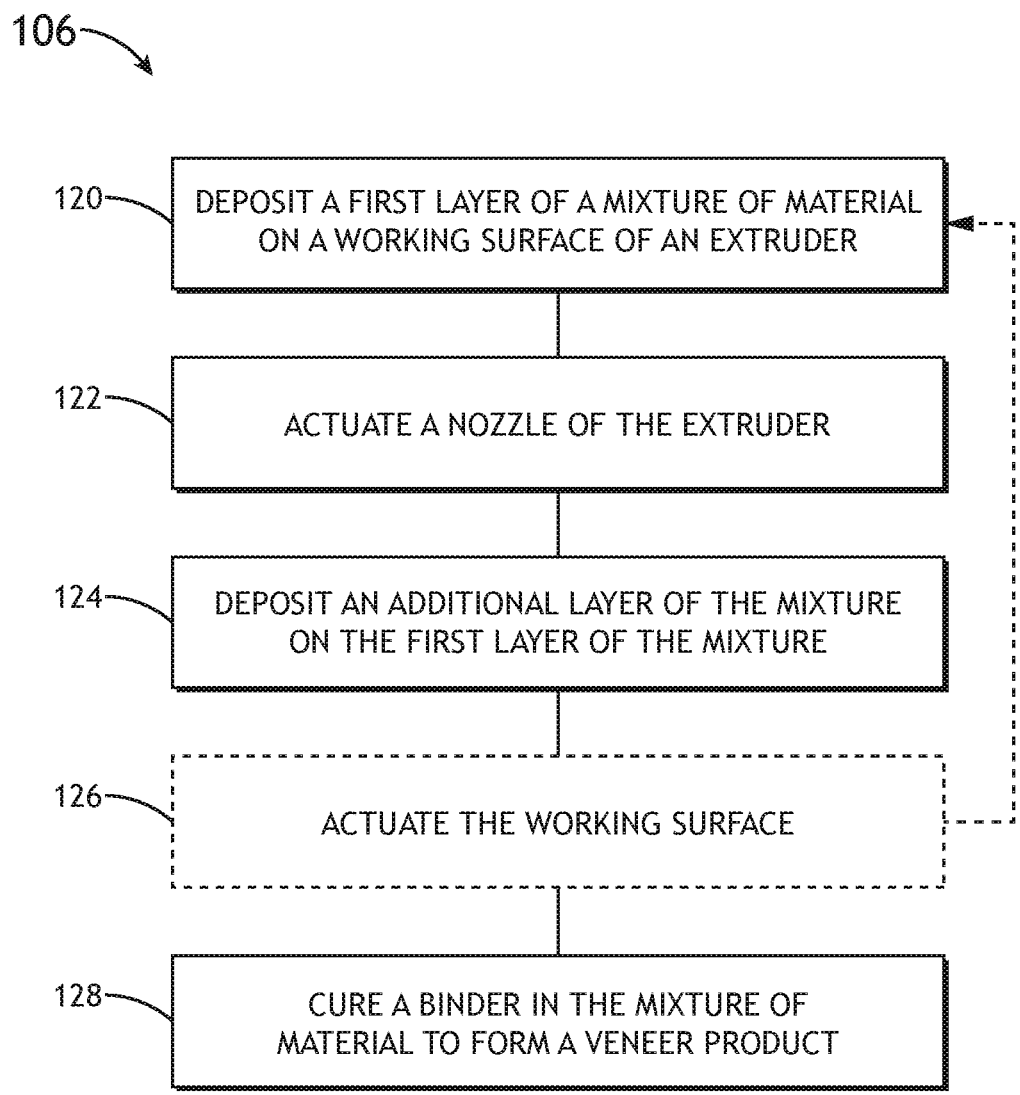
FIG. 1C is a flow diagram illustrating a method or process of extrusion additive manufacturing for veneer applications, in accordance with one or more embodiments of the disclosure.
Figure 2A:
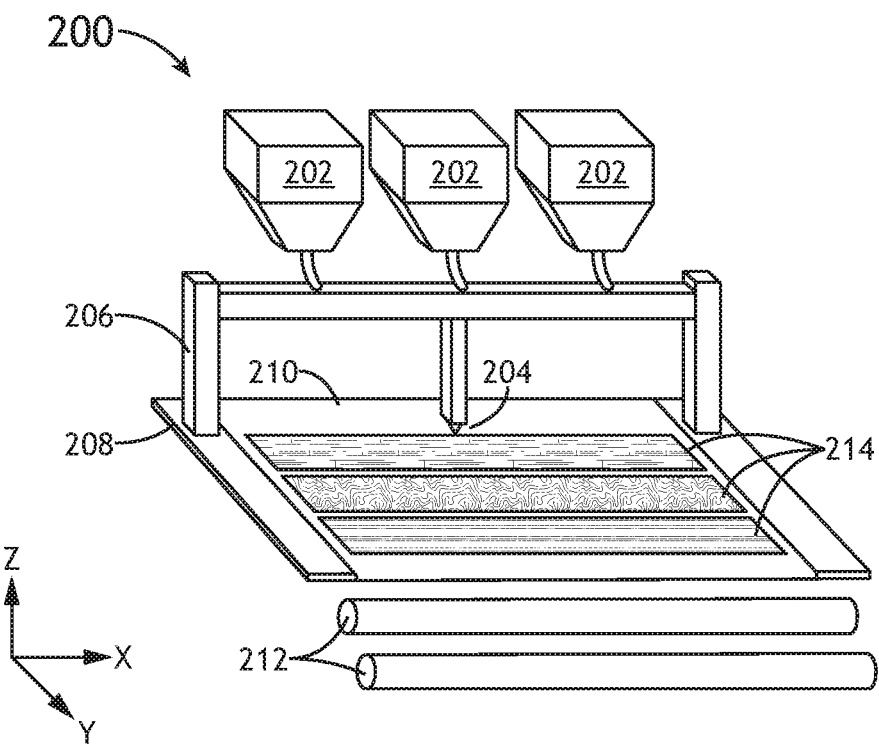
FIG. 2A illustrates an extruder for veneer applications, in accordance with one or more embodiments of the disclosure.
Figure 2B:
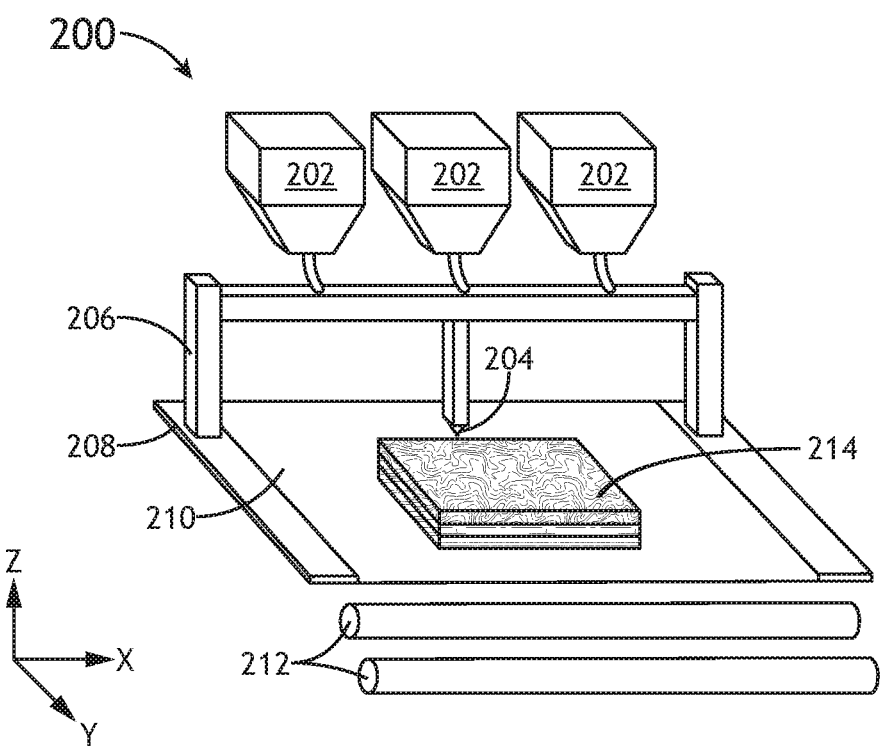
FIG. 2B illustrates an extruder for veneer applications, in accordance with one or more embodiments of the disclosure.

FIGS. 1A-1C are flow diagrams illustrating methods or processes of extrusion additive manufacturing for veneer applications, in accordance with one or more embodiments of the disclosure. FIGS. 2A and 2B illustrate an extruder 200 for extrusion additive manufacturing for veneer applications, in accordance with one or more embodiments of the disclosure.

FIG. 1A is a flow diagram illustrating a method or process 100 of extrusion additive manufacturing for veneer applications, in accordance with one or more embodiments of the disclosure.

In a step 102, material is loaded into one or more hoppers of an extruder. The extruder 200 may include one or more hoppers 202.

At least some of the one or more hoppers 202 may be filled with a raw wood material. For example, the raw wood material may include, but is not limited to, sawdust, wood shavings, wood pulp, or other wood product. By way of another example, where there are multiple hoppers 202 filled with a wood material, each hopper 202 may include wood material from the same source. By way of another example, where there are multiple hoppers 202 filled with a wood material, each hopper 202 may include wood material from different sources. For instance, each hopper 202 may include wood material from a different species of tree. In addition, each hopper 202 may include wood material from the different batches of the same species of tree.

At least some of the one or more hoppers 202 may be filled with a binder (or binding agent). The binder may include, but is not limited to, a thermoplastic, an adhesive, and/or water. The adhesive may include, but is not limited to, an epoxy resin, a wood glue, or other adhesive suitable for use with wood. For example, the epoxy resin may include a clear epoxy resin that is not visible in the stack of lumber once dry. For instance, the use of an epoxy resin may allow for the color of the sheets of veneer to be replicated throughout the stack of lumber, without concern of unwanted color (e.g., a white or yellow layer). By way of another example, the epoxy resin may be a two-part epoxy resin. It is noted herein the adhesive may be in a powder, particle, and/or particulate form to mix with the wood product.

At least some of the one or more hoppers 202 may be filled with a material selected to generate a particular color, design, grain width, and/or grain pattern. For example, the material may include a dyed water-based material. By way of another example, the material may include a thermal-sensitive material. The thermal-sensitive material may be configured to activate (e.g., in the presence of heat) and generate a particular color, design, grain width, and/or grain pattern. The thermal-sensitive material may be in a powder, particle, and/or particulate form to mix with the wood product.

At least some of the one or more hoppers 202 may be filled with a fire-resistant and/or fire-retardant material. For example, the fire-resistant and/or fire-retardant material may include, but is not limited to, metal powder, metal particles, metal shavings, or other metal product. By way of another example, the fire-resistant and/or fire-retardant material may include, but is not limited to, a concrete, a silicate (e.g., a material with a chemical compound including $SiO_2$ structures), or another material with one or more fire-resistant and/or fire-retardant properties.

At least some of the one or more hoppers 202 may be filled with a removable support material configured to support a three-dimensional structure being fabricated (e.g., where gravity would cause the three-dimensional structure to break prior to completion). For example, the removable support material may be a dissolvable plastic including, but not limited to, polyvinyl alcohol (PVA), high-impact polystyrene (HIPS), or the like. By way of another example, the removable support material may be a breakway support material.

In a step 104, a mixture may be generated from material in the one or more hoppers of the extruder. The extruder 200 may include a chamber coupled to a gantry 206 or integrated within the gantry 206 (e.g., a member of the gantry 206 includes a hollow portion). The one or more hoppers 202 may deposit material into the chamber. The chamber may be configured to feed one or more nozzles 204. For example, the chamber may include a screw assembly coupled to a gantry 206, and the screw assembly may provide material received from the one or more hoppers 202 to a nozzle 204 of the one or more nozzles 204. By way of another example, the chamber may feed a nozzle 204 of the one or more nozzles 204 via gravity-feed. It is noted herein, however, that a hopper 202 may be directly coupled to (and directly feed) a nozzle 204 (e.g., where the hopper 202 holds a removable support material not intended to be a part of the mixture).

The composition of the mixture may be controlled via one or more operational parameters of the one or more nozzles 204. The one or more operational parameters (e.g., temperature, flow rate, and/or spray hole diameter) of the one or more nozzles 204 may be independently selected and/or controlled (e.g., via one or more manufacturing processes during fabrication of the one or more nozzles 204, manual controls during use of the one or more nozzles 204, and/or electronic controls during use of the one or more nozzles 204). It is noted herein, however, that the selection and/or control of the one or more operational parameters may be dependent on other system control parameters (e.g., parameters of other components of the extruder 200, such as gantry track speed along an axis, fabricating surface speed along an axis, or the like).

In a step 106, a veneer product may be fabricated via the extruder. The extruder 200 may include a platform 208 on a plane (e.g., an xy-plane) and a working surface 210 configured to translate along an axis (e.g., the y-axis). The working surface 210 may lead to a set of rollers 212. For example, the set of rollers 212 may be independent from the working surface 210. By way of another example, the set of rollers 212 may be a standalone unit separate from the extruder 200. It is noted herein, however, that the working surface 210 may translate with the assistance of the set of rollers 212.

The gantry 206 of the extruder 200 may be configured to translate the one or more nozzles 204 along a first axis (e.g., the x-axis) and/or a second axis (e.g., the z-axis) while the one or more nozzles 204 deposit material from the one or more hoppers 202 to form a veneer product 214. The working surface 210 of the extruder 200 may be configured to translate along a first axis (e.g., a y-axis) while the one or more nozzles 204 deposit material from the one or more hoppers 202 to form the veneer product 214. The material may be deposited to generate a particular color, design, grain pattern, and/or grain width for the veneer product 214.

As illustrated in FIG. 2A, the veneer product 214 may include one or more sheets of veneer 214, each sheet of veneer 214 having a single layer. FIG. 1B is a flow diagram illustrating sub-steps of the step 106 of the method or process 100 of extrusion additive manufacturing for veneer applications to fabricate the veneer product 214 in FIG. 2A, in accordance with one or more embodiments of the disclosure.

In a step 110, a first portion of a mixture of material may be deposited on a working surface of an extruder. The one or more nozzles 204 may travel along the x-axis to deposit the first portion of the mixture of material to generate a particular color, design, grain pattern, and/or grain width for the veneer product 214.

In a step 112, the working surface may be actuated. The working surface 210 may translate along the y-axis, and the one or more nozzles 204 may reset (e.g., lower) to the working surface 210.

In a step 114, an additional portion of the mixture may be deposited proximate to the first portion of the mixture. The one or more nozzles 204 may travel along the x-axis to deposit the additional portion of the mixture of material to generate the particular color, design, grain pattern, and/or grain width for the veneer product 214. With the actuating of the working surface 210, the one or more nozzles 204 may make multiple passes when travelling along the x-axis to generate the particular color, design, grain pattern, and/or grain width for the veneer product 214.

In a step 116, the mixture may be cured to form a veneer product. The mixture may be applied to the working surface at an increased temperature, such that the mixture may cure as it cools to form the veneer product. The mixture may be applied at or below a room operating temperature, and the binder may be activated (e.g., via heat, pressure, a combination of heat and pressure, a chemical reaction, or the like) to bind the portions deposited on the working surface prior to the mixture curing as it cools to form the veneer product.

As illustrated in FIG. 2B, the veneer product 214 may include a three-dimensional structure 214 including multiple layers of veneer. FIG. 1C is a flow diagram illustrating sub-steps of the step 106 of the method or process 100 of extrusion additive manufacturing for veneer applications to fabricate the veneer product 214 in FIG. 2B, in accordance with one or more embodiments of the disclosure.

In a step 120, a first layer of a mixture of material is deposited on a working surface of an extruder. The one or more nozzles 204 may travel along the x-axis to deposit the first layer of the mixture of material to generate a particular color, design, grain pattern, and/or grain width for the veneer product 214.

In a step 122, a nozzle of the extruder is actuated. The one or more nozzles 204 may be actuated (e.g., raised or lowered) along the z-axis to prepare to deposit an additional layer of material to generate a particular color, design, grain pattern, and/or grain width for the veneer product 214.

In a step 124, an additional layer of the mixture is deposited on the first layer of the mixture. The one or more nozzles 204 may travel along the x-axis to deposit the additional layer of the mixture of material to generate the particular color, design, grain pattern, and/or grain width for the veneer product 214. With the actuating of the one or more nozzles 204, the one or more nozzles 204 may make multiple passes when travelling along the z-axis to generate the particular color, design, grain pattern, and/or grain width for the veneer product 214.

In an optional step 126, the working surface is actuated. The working surface 210 may translate along the y-axis so that the one or more nozzles 204 may reset (e.g., lower) to the working surface 210. The steps 120, 122, and/or 124 may then again be performed.

In a step 128, the mixture may be cured to form a veneer product. The mixture may be applied to the working surface at an increased temperature, such that the mixture may cure as it cools to form the veneer product. The mixture may be applied at or below a room operating temperature, and the binder may be activated (e.g., via heat, pressure, a combination of heat and pressure, a chemical reaction, or the like) to bind the portions deposited on the working surface prior to the mixture curing as it cools to form the veneer product.

In this regard, the motion of the components of the extruder 200 (e.g., along the x-axis, y-axis, and/or z-axis) may allow the extruder 200 to act as an additive manufacturing device for veneer applications, being able to form veneer having a single layer (e.g., one or more sheets) or multiple layers (e.g., a three-dimensional structure).

In a step to the process 100, the veneer product may be firetreated. For example, the veneer product 214 may be treated with a fire-resistant and/or fire-retardant material. By way of another example, the veneer product 214 may be treated with fire. Where the veneer product 214 is a single sheet of veneer or a three-dimensional structure, the veneer product 214 may be firetreated as a single component. Where the veneer product 214 includes multiple sheets of veneer, each sheet of veneer may be firetreated individually, in batches, or in bulk. It is noted herein, however, that where the generated mixture used to fabricate a veneer product 214 includes a heat-sensitive compound such as a thermoplastic, that firetreating may alter (e.g., re-melt, re-cure, or the like) the heat-sensitive compound.

In a step of the process 100, a coating may be applied to the veneer product 214. For example, the coating may include an infiltrant, a sealant, or other coating configured to protect the veneer product 214. For instance, the infiltrant may include an adhesive configured to fill in pores, gaps, cracks, or other imperfections that may reduce a strength of the veneer product 214.

Figure 3:
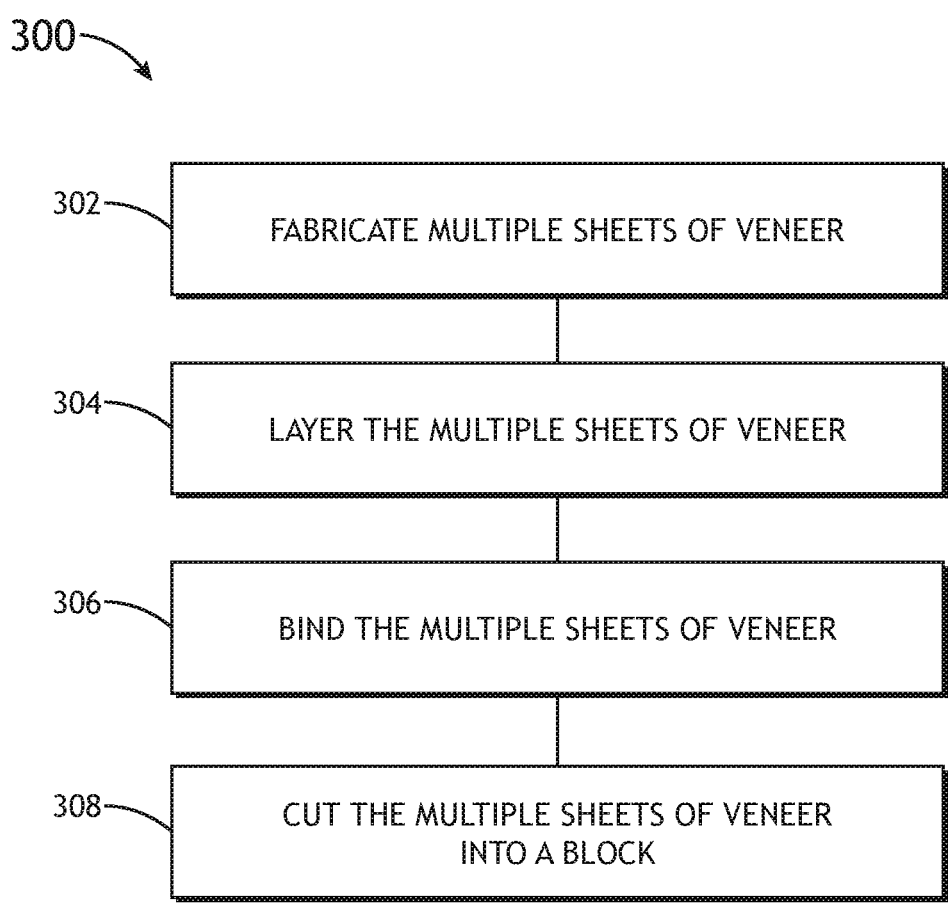
FIG. 3 is a flow diagram illustrating a method or process of extrusion additive manufacturing for veneer applications, in accordance with one or more embodiments of the disclosure.
Figure 4A:
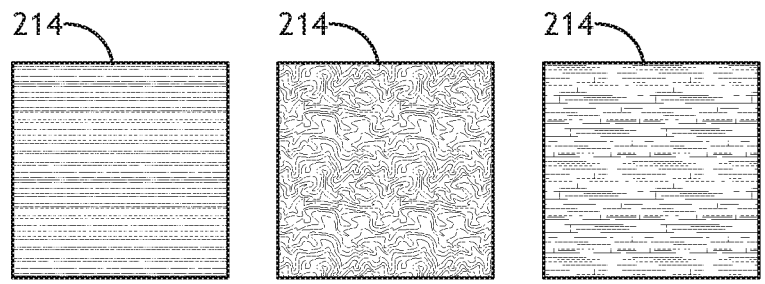
FIG. 4A illustrates sheets of veneer fabricated via extrusion additive manufacturing, in accordance with one or more embodiments of the disclosure.
Figure 4B:
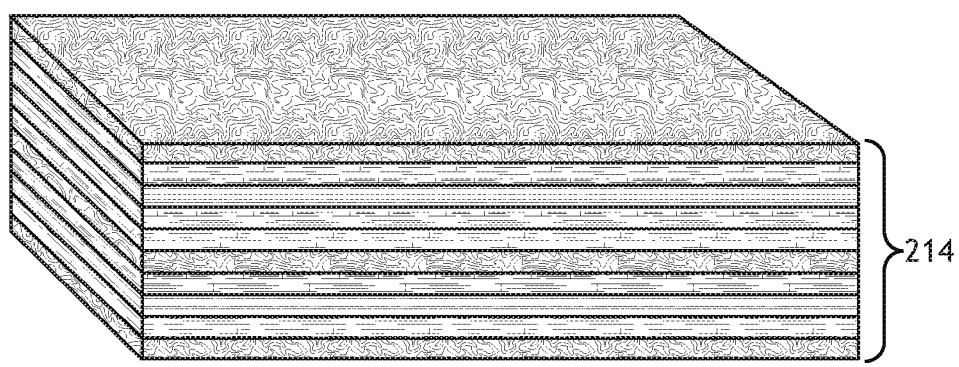
FIG. 4B illustrates a veneer block or core generated from sheets of veneer fabricated via extrusion additive manufacturing, in accordance with one or more embodiments of the disclosure.

FIG. 3 is a flow diagram illustrating a method or process 300 of extrusion additive manufacturing for veneer applications, in accordance with one or more embodiments of the disclosure. FIG. 4A illustrates sheets of veneer fabricated via extrusion additive manufacturing, in accordance with one or more embodiments of the disclosure. FIG. 4B illustrates a veneer block or core generated from sheets of veneer fabricated via extrusion additive manufacturing, in accordance with one or more embodiments of the disclosure.

In a step 302, multiple sheets of veneer are fabricated. The multiple sheets of veneer 214 may be fabricated with one or more steps of the process 100, above. At least some of the multiple sheets of veneer may include a similar color, design, grain pattern, and/or grain width. At least some of the multiple sheets of veneer may include a different color, design, grain pattern, and/or grain width.

In a step 304, the multiple sheets of veneer are layered. The multiple sheets of veneer 214 may be layered to produce a stack 400 of sheets of veneer 214 (e.g., a three-dimensional structure 214 including multiple layers of veneer), the stack 400 having a particular color, design, grain pattern, and/or grain width across the layered multiple sheets of veneer. For example, the multiple sheets of veneer 214 may be layered in any order to generate the particular color, design, grain pattern, and/or grain width. For instance, as illustrated in FIG. 4B, multiple sheets of veneer 214 with different colors, designs, grain patterns, and/or grain widths may be layered to create the stack 400 with the particular color, design, grain pattern, and/or grain width. In addition, multiple sheets of veneer 214 with a similar color, design, grain pattern, and/or grain width may be layered to create the stack 400 with the particular color, design, grain pattern, and/or grain width. Generally, the multiple sheets of veneer 214 may be layered in any order (e.g., without regard to the order of fabrication) in order to create the stack 400 with the particular color, design, grain pattern, and/or grain width.

In a step 306, the multiple sheets of veneer are bound together. The binding may occur with the addition of a binder within the stack 400. For example, the binder may be the thermoplastic material included in the mixture used to fabricate the multiple sheets of veneer 214. For instance, increasing the temperature of the stack 400 (e.g., through external application of heat, through application of pressure, or a combination of heat and pressure) may cause the thermoplastic material to melt or fuse together to form the stack 400. By way of another example, a layer of adhesive may be placed between the layers of the multiple sheets of veneer 214, which may bind the layers of sheets of veneer 214 together to form the stack 400. The adhesive may include, but is not limited to, an epoxy resin, a wood glue, or other adhesive suitable for use with wood. For example, the epoxy resin may include a clear epoxy resin that is not visible in the stack of lumber once dry. For instance, the use of an epoxy resin may allow for the color of the sheets of veneer to be replicated throughout the stack of lumber, without concern of unwanted color (e.g., a white or yellow layer). By way of another example, the epoxy resin may be a two-part epoxy resin.

In a step 308, the multiple sheets of veneer are cut into a block or core. The stack 400 may be positioned in any orientation when the block or core is cut out. For example, the block or core may be cut from any face or surface of the stack 400. By way of another example, the block or core may be cut at any angle within any face or surface of the stack 400.

Figure 5:
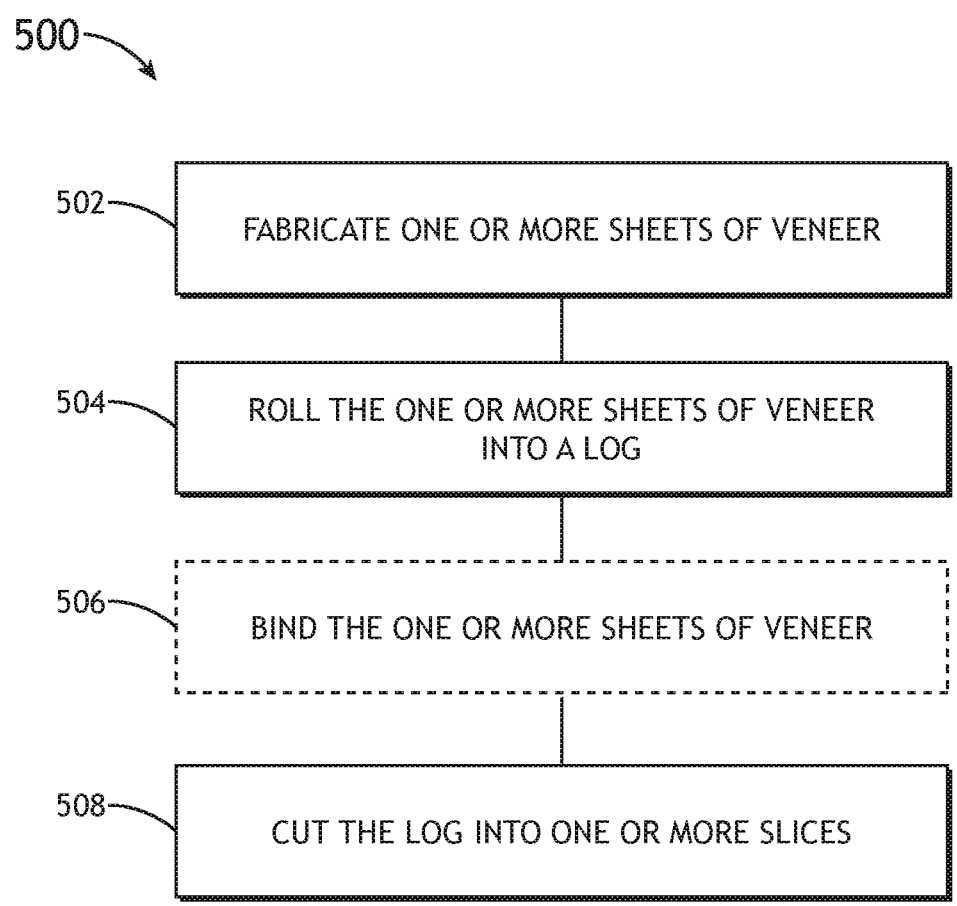
FIG. 5 is a flow diagram illustrating a method or process of extrusion additive manufacturing for veneer applications, in accordance with one or more embodiments of the disclosure.
Figure 6A:
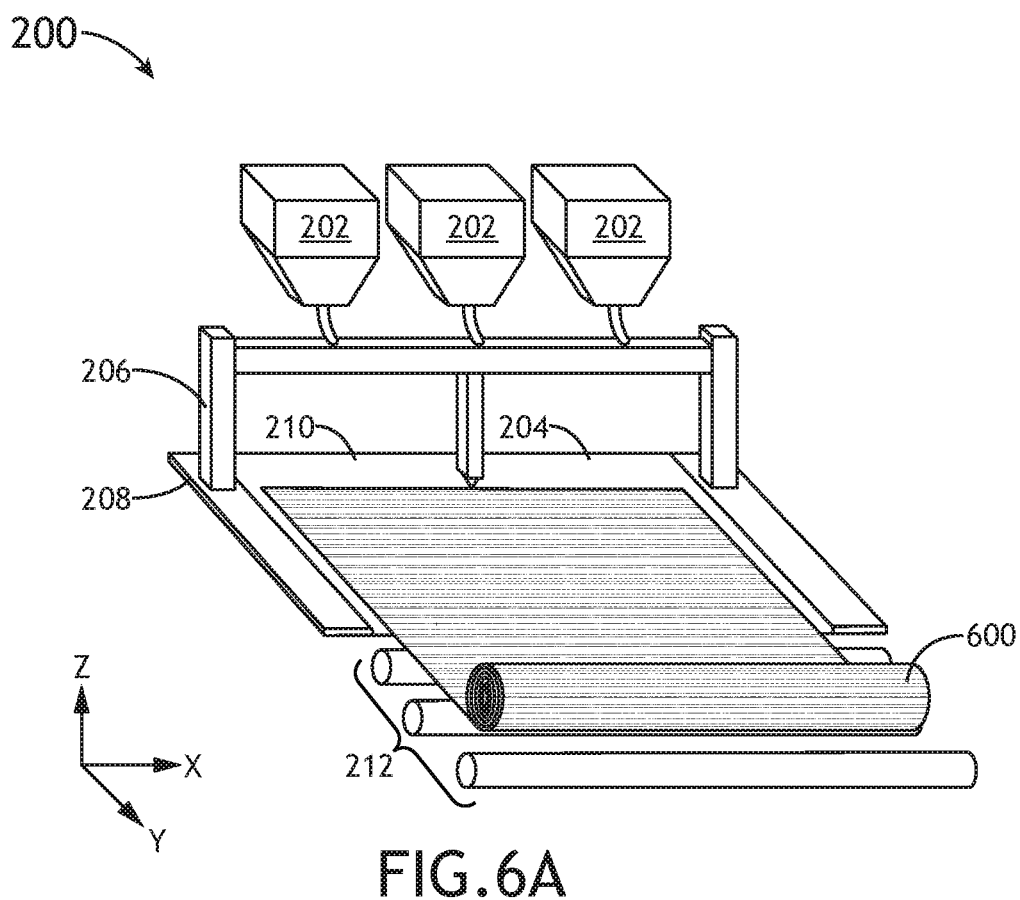
FIG. 6A illustrates a veneer log fabricated from sheets of veneer, the sheets of veneer fabricated via extrusion additive manufacturing, in accordance with one or more embodiments of the disclosure.
Figure 6B:
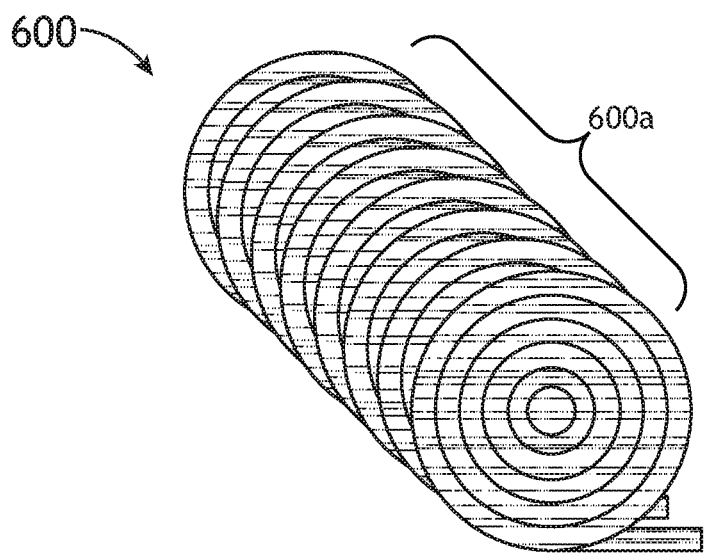
FIG. 6B illustrates a portion of a veneer log fabricated from sheets of veneer, the sheets of veneer fabricated via extrusion additive manufacturing, in accordance with one or more embodiments of the disclosure.
Figure 7A:
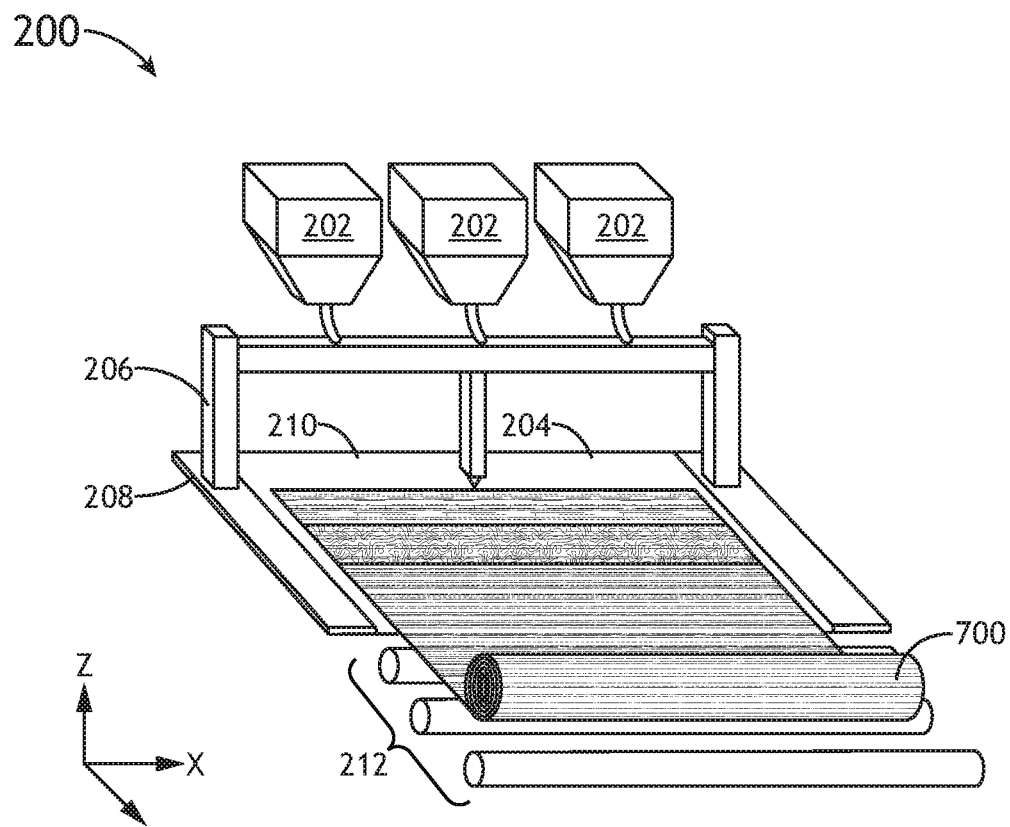
FIG. 7A illustrates a veneer log fabricated from sheets of veneer, the sheets of veneer fabricated via extrusion additive manufacturing, in accordance with one or more embodiments of the disclosure.
Figure 7B:
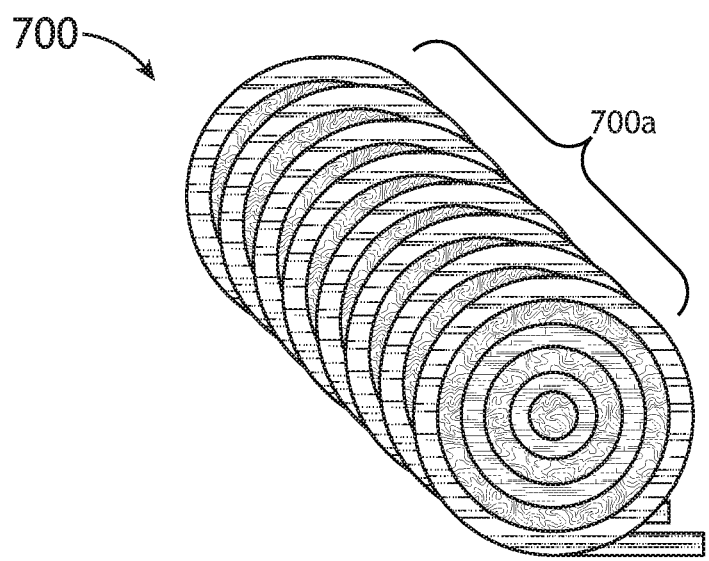
FIG. 7B illustrates a portion of a veneer log fabricated from sheets of veneer, the sheets of veneer fabricated via extrusion additive manufacturing, in accordance with one or more embodiments of the disclosure.

FIG. 5 is a flow diagram illustrating a method or process 500 of extrusion additive manufacturing for veneer applications, in accordance with one or more embodiments of the disclosure. FIGS. 6A and 6B generally illustrate a veneer log being fabricated from sheets of veneer, the sheets of veneer fabricated via extrusion additive manufacturing, in accordance with one or more embodiments of the disclosure. FIGS. 7A and 7B generally illustrate a veneer log being fabricated from sheets of veneer, the sheets of veneer fabricated via extrusion additive manufacturing, in accordance with one or more embodiments of the disclosure.

In a step 502, one or more sheets of veneer are fabricated. The one or more sheets of veneer 214 may be fabricated with one or more steps of the process 100, above. At least some of the one or more sheets of veneer may include a similar color, design, grain pattern, and/or grain width. At least some of the one or more sheets of veneer may include a different color, design, grain pattern, and/or grain width.

In a step 504, the one or more sheets of veneer are rolled into a log. The log may be fabricated from one or multiple sheets of veneer 214. For example, in the case of multiple sheets of veneer 214, the multiple sheets of veneer 214 may include a similar color, design, grain pattern, and/or grain width. By way of another example, in the case of multiple sheets of veneer 214, the multiple sheets of veneer 214 may include different colors, designs, grain patterns, and/or grain widths.

In one example, as illustrated in FIG. 6A, a log 600 including a particular color, design, grain pattern, and/or grain width may be fabricated from a single piece of veneer 214. The single piece of veneer 214 may be fabricated from the extruder 200 with the assistance of the working surface 210 configured to translate along an axis (e.g., the y-axis) and/or the set of rollers 212. It is noted herein, however, that the log 600 may be rolled from multiple sheets of veneer fed either sequentially or in a stack, where the multiple sheets of veneer 214 include a similar color, design, grain pattern, and/or grain width.

In another example, as illustrated in FIG. 7A, a log 700 including a particular color, design, grain pattern, and/or grain width may be fabricated from multiple pieces of veneer 214, where at least some of the multiple pieces of veneers 214 include a different color, design, grain pattern, and/or grain width. The multiple pieces of veneer 214 may be fabricated from the extruder 200 with the assistance of the working surface 210 configured to translate along an axis (e.g., the y-axis) and/or the set of rollers 212. The multiple sheets of veneer 214 may be fed either sequentially or in a stack.

In an optional step 506, the one or more sheets of veneer are bound together. The binding may occur with the addition of a binder within the log 600, 700. For example, the binder may be the thermoplastic material included in the mixture used to fabricate the one or more sheets of veneer 214. For instance, increasing the temperature of the log 600, 700 (e.g., through external application of heat, through application of pressure, or a combination of heat and pressure) may cause the thermoplastic material to melt or fuse together to form the log 600, 700. By way of another example, an adhesive placed on a working surface of the one or more sheets of veneer 214, while the one or more sheets of veneer 214 are rolled into the log 600, 700, may bind the layers of sheets of veneer 214 together to form the log 600, 700.

It is noted herein the step 506 may be considered optional as the one or more sheets of veneer 214 may only be temporarily kept within the log 600, 700. For example, the log 600, 700 may be necessary for purposes of transporting the one or more sheets of veneer 214 for use with another fabricating device requiring rolls of veneer as a source material. In this regard, it may not be desirable to bind the one or more sheets of veneer 214 forming the log 600, 700 together. Therefore, the description should not be interpreted as a limitation on the scope of the disclosure but merely an illustration.

In a step 508, the log may be cut into one or more slices. One or more slices may be cut from a working surface of the log. For example, a plane of the working surface of the log may be orthogonal to a long axis of the log (e.g., is an end surface). The one or more slices may be of a select thickness. For example, the one or more slices may be of a thickness selected for a sheet of veneer. By way of another example, the one or more slides may be of a thickness selected for a veneer block or core.

As illustrated in FIG. 6B, one or more slices 600a may be cut from the log 600. As illustrated in FIG. 7B, one or more slices 700a may be cut from the log 700. The cut face of the one or more slices 600a, 700a may be the intended working surface for the slices 600a, 700a. For example, the working surface for each slice 600a, 700a may include a similar color, design, grain pattern, and/or grain width. By way of another example, the working surface for each slice 600a, 700a may include different colors, designs, grain patterns, and/or grain widths.

Although embodiments of the disclosure illustrate the log 600, 700 being cut into slices 600a, 700a, it is noted herein the log 600, 700 may be cut in other ways. For example, a block or core may be cut out from the log 600, 700. For instance, a working surface from which the block or core may be cut may include any flat surface of the log 600, 700 (e.g., an end surface, or the like). Generally, however, any surface of the log 600, 700 may be a working surface, especially where the log 600, 700 includes a non-circular cross-section. Therefore, the description should not be interpreted as a limitation on the scope of the disclosure but merely an illustration.

It is noted herein the processes 100, 300, 500 are not limited to the steps and/or sub-steps provided. The processes 100, 300, 500 may include more or fewer steps and/or sub-steps. The processes 100, 300, 500 may perform the steps and/or sub-steps simultaneously. The processes 100, 300, 500 may perform the steps and/or sub-steps sequentially, including in the order provided or an order other than provided. Therefore, the above description should not be interpreted as a limitation on the scope of the disclosure but merely an illustration.

In this regard, a veneer with a selected color, design, grain width, and/or grain pattern may be digitally designed without being reliant upon natural resources and/or a limited supply. The veneer may recreate a color, design, grain width, and/or grain pattern based on a veneer selected or provided by a user (e.g., a consumer, manufacturer, or other individual involved with the selection of the veneer being sequenced). The veneer may be repeatably fabricated to ensure a consistency of a component aesthetic mass-produced for, disseminated for, and/or installed within a vehicle (e.g., an aircraft, an automobile, or the like). The ability to repeatably fabricate the veneer may allow for the repair and/or replacement of an original product with an exact duplicate of the original product. The ability to repeatably fabricate the veneer may result in bulk production, production on demand, the ability to maintain a digital inventory, and/or potential cost savings (e.g., in the form of material collection and use, or the like).

Figure 8:
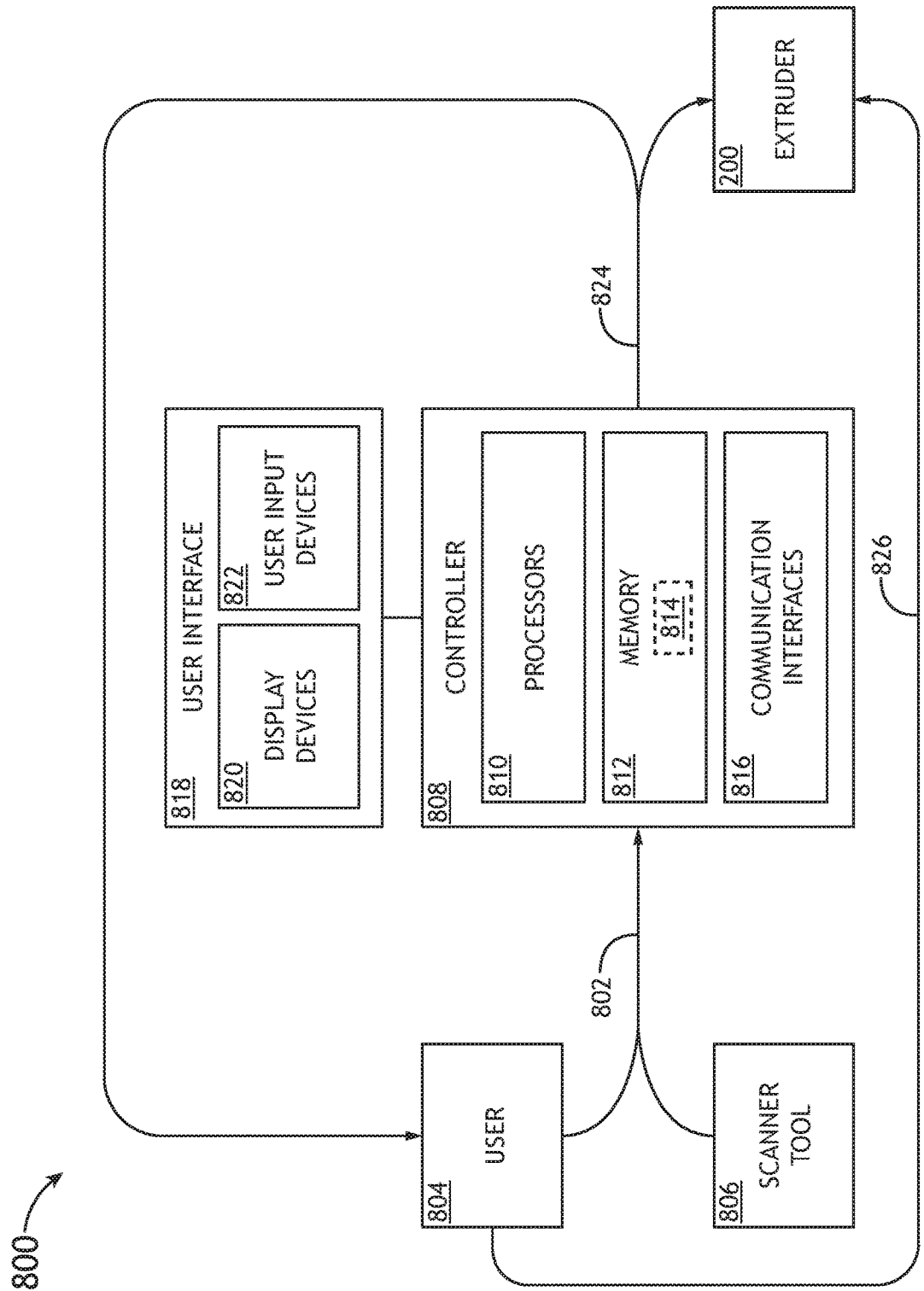
FIG. 8 illustrates an extrusion additive manufacturing system for veneer applications, in accordance with one or more embodiments of the disclosure.

FIG. 8 illustrates a system 800 used for extrusion additive manufacturing for veneer applications, in accordance with one or more embodiments of the present disclosure.

A set of data 802 may be transmitted through the system 800. The set of data 802 may include data defining a particular color, design, grain pattern, and/or grain width for veneer. The set of data 802 may be received from a user 804. For example, the user 804 may include a consumer, a manufacturer, or other individual involved with the selection of the veneer being sequenced. It is noted herein the set of data 802 may be received by the one or more controllers 808 either directly or indirectly (e.g., through an intermediary, where the consumer passes the set of data 802 to the manufacturer and the manufacturer uploads the data).

The set of data 802 may be received from a scanning tool 806. For example, where the veneer needs to match a previously-used and/or installed veneer in a vehicle (e.g., airplane, automobile, or the like), the color, design, grain width, and/or grain pattern may be scanned with a scanning tool 806 to generate the set of data 802.

The set of data 802 may be received by one or more controllers 808. The one or more controllers 808 may include may include at least one of one or more processors 810, memory 812 configured to store one or more sets of program instructions 814, and/or one or more communication interfaces 816.

The one or more processors 810 provides processing functionality for at least the one or more controllers 808 and may include any number of processors, micro-controllers, circuitry, field programmable gate array (FPGA) or other processing systems, and resident or external memory for storing data, executable code, and other information accessed or generated by the one or more controllers 808. The one or more processors 810 may execute one or more software programs (e.g., the one or more sets of program instructions 814) embodied in a non-transitory computer readable medium (e.g., the memory 812) that implement techniques described herein. The one or more processors 810 are not limited by the materials from which it is formed or the processing mechanisms employed therein and, as such, may be implemented via semiconductor(s) and/or transistors (e.g., using electronic integrated circuit (IC) components), and so forth.

The memory 812 may be an example of tangible, computer-readable storage medium that provides storage functionality to store various data and/or program code associated with operation of the one or more controllers 808 and/or one or more processors 810, such as software programs and/or code segments, or other data to instruct the one or more processors 810 and/or other components of the one or more controllers 808, to perform the functionality described herein. Thus, the memory 812 may store data, such as a program of instructions for operating the one or more controllers 808, including its components (e.g., one or more processors 810, the one or more communication interfaces 816, or the like), and so forth. It should be noted that while a single memory 812 is described, a wide variety of types and combinations of memory (e.g., tangible, non-transitory memory) may be employed. The memory 812 may be integral with the one or more processors 810, may include stand-alone memory, or may be a combination of both. Some examples of the memory 812 may include removable and non-removable memory components, such as random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth.

The one or more controllers 808 may be configured to perform one or more process steps, as defined by the one or more sets of program instructions 814. The one or more process steps may be performed iteratively, concurrently, and/or sequentially. The one or more sets of program instructions 814 may be configured to operate via a control algorithm, a neural network (e.g., with states represented as nodes and hidden nodes and transitioning between them until an output is reached via branch metrics), a kernel-based classification method, a Support Vector Machine (SVM) approach, canonical-correlation analysis (CCA), factor analysis, flexible discriminant analysis (FDA), principal component analysis (PCA), multidimensional scaling (MDS), principal component regression (PCR), projection pursuit, data mining, prediction-making, exploratory data analysis, supervised learning analysis, boolean logic (e.g., resulting in an output of a complete truth or complete false value), fuzzy logic (e.g., resulting in an output of one or more partial truth values instead of a complete truth or complete false value), or the like. For example, in the case of a control algorithm, the one or more sets of program instructions 814 may be configured to operate via proportional control, feedback control, feedforward control, integral control, proportional-derivative (PD) control, proportional-integral (PI) control, proportional-integral-derivative (PID) control, or the like.

The one or more communication interfaces 816 may be operatively configured to communicate with components of the one or more controllers 808. For example, the one or more communication interfaces 816 may be configured to retrieve data from the one or more processors 810 or other devices, transmit data for storage in the memory 812, retrieve data from storage in the memory 812, and so forth. The one or more communication interfaces 816 may also be coupled (e.g., physically, electrically, and/or communicatively) with the one or more processors 810 to facilitate data transfer between components of the one or more controllers 808 and the one or more processors 810. It should be noted that while the one or more communication interfaces 816 is described as a component of the one or more controllers 808, one or more components of the one or more communication interfaces 816 may be implemented as external components coupled (e.g., physically, electrically, and/or communicatively) to the one or more controllers 808 via a wired and/or wireless connection. The one or more controllers 808 may also include and/or connect to one or more input/output (I/O) devices. In some embodiments, the one or more communication interfaces 816 includes or is coupled (e.g., physically, electrically, and/or communicatively) to a transmitter, receiver, transceiver, physical connection interface, or any combination thereof.

The one or more controllers 808 may be coupled (e.g., physically, electrically, and/or communicatively) to one or more user interfaces 818. The one or more user interfaces 818 may include and/or be configured to interact with one or more display devices 820. The one or more user interfaces 818 may include and/or be configured to interact with one or more user input devices 822.

The one or more communication interfaces 816 may be operatively configured to communicate with one or more user interfaces 818. The one or more controllers 808 and the one or more user interfaces 818 may be separate components (e.g., have separate housings and/or separate chassis). It is noted herein, however, that the one or more controllers 808 and the one or more user interfaces 818 may be components integrated in a single housing and/or on a single chassis.

The one or more display devices 820 may include any display device known in the art. For example, the one or more display devices 820 may include, but are not limited to, a liquid crystal display (LCD), a light-emitting diode (LED) display, an organic light-emitting diode (OLED) based display, or the like. Those skilled in the art should recognize that a variety of display devices 820 may be suitable for implementation in the disclosure and the particular choice of display device may depend on a variety of factors, including, but not limited to, form factor, cost, and the like. In a general sense, any display device capable of integration with the one or more user input devices 822 (e.g., touchscreen, bezel mounted interface, keyboard, mouse, trackpad, and the like) is suitable for implementation in the disclosure.

The one or more user input devices 822 may include any data input device known in the art. For example, the one or more user input devices 822 may include, but are not limited to, a keyboard, a keypad, a touchscreen, a lever, a knob, a scroll wheel, a track ball, a switch, a dial, a sliding bar, a scroll bar, a slide, a touch pad, a paddle, a steering wheel, a joystick, a button, a bezel input device or the like. In the case of a touchscreen interface, those skilled in the art should recognize that a large number of touchscreen interfaces may be suitable for implementation in the disclosure. For instance, a display device may be integrated with a touchscreen interface, such as, but not limited to, a capacitive touchscreen, a resistive touchscreen, a surface acoustic based touchscreen, an infrared based touchscreen, or the like. In a general sense, any touchscreen interface capable of integration with the display portion of a display device is suitable for implementation in the disclosure.

The one or more communication interfaces 816 may be operatively configured to communicate with components of the scanning tool 806.

The one or more communication interfaces 816 may be operatively coupled (e.g., physically, electrically, and/or communicatively) with components of the extruder 200. For example, the one or more controllers 808 may be configured to adjust one or more operational parameters 824 for the extruder 200. For instance, the one or more operational parameters 824 may include operational parameters for the one or more nozzles 204 (e.g., temperature, flow rate, and/or spray hole diameter), the one or more hoppers 202 (e.g., feed rate of a particular material within a particular hopper 202), the gantry 206 (e.g., translation in a direction along the x-axis or the z-axis, as illustrated in FIGS. 2A, 6A, and 7A), the working surface 210 (e.g., translation in a direction along the y-axis, as illustrated in FIGS. 2A, 6A, and 7A), or the like.

Although embodiments of the present disclosure illustrate the one or more controllers 808 as adjusting the one or more operational parameters 824 of the extruder 200, it is noted herein the one or more operational parameters may be adjusted via manual controls or manual instructions 826 from the user 804. Therefore, the description should not be interpreted as a limitation on the scope of the disclosure but merely an illustration.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed:

1. A method of extrusion additive manufacturing for veneer products, comprising:
   loading material into an extruder, the material including wood product and a binder;
   generating a mixture from the material;
   fabricating a veneer product by:
   depositing a first portion of the mixture on a working surface of the extruder, producing a first sheet of veener configured with a first pattern;
   actuating the working surface; and
   depositing an additional portion of the mixture on the working surface of the extruder adjacent to the first position of the mixture deposited on the working surface, producing a second sheet of veneer configured with a second pattern;
   layering the first sheet of veneer and the second sheet of veneer;
   binding the first sheet of veneer and the second sheet of veneer to create a veneer block; and
   slicing the veneer block, wherein slicing the veneer block generates a third veneer configured with a third pattern.

2. The method of claim 1, the first portion being deposited as part of a first layer of the veneer product, the method further comprising:
   actuating a nozzle of the extruder; and
   depositing an additional layer of the mixture on the first layer.

3. The method of claim 2, further comprising:
   curing the mixture to form the veneer product.

4. The method of claim 1, the veneer product including a three-dimensional structure, the three-dimensional structure being formed from at least the first sheet of veneer and the second sheet of veneer.

5. The method of claim 1, the binder being a thermoplastic.

6. The method of claim 1, the binder being an adhesive.

7. The method of claim 1, the material further including at least one of a fire-retardant or a fire-resistant material.

8. The method of claim 7, the material further including a metal.

* * * * *